US009612863B2

(12) United States Patent
Ventroux

(10) Patent No.: US 9,612,863 B2
(45) Date of Patent: Apr. 4, 2017

(54) HARDWARE DEVICE FOR ACCELERATING THE EXECUTION OF A SYSTEMC SIMULATION IN A DYNAMIC MANNER DURING THE SIMULATION

(75) Inventor: Nicolas Ventroux, Massy (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 499 days.

(21) Appl. No.: 13/984,525

(22) PCT Filed: Feb. 13, 2012

(86) PCT No.: PCT/EP2012/052386
§ 371 (c)(1),
(2), (4) Date: Oct. 29, 2013

(87) PCT Pub. No.: WO2012/110445
PCT Pub. Date: Aug. 23, 2012

(65) Prior Publication Data
US 2014/0325516 A1   Oct. 30, 2014

(30) Foreign Application Priority Data

Feb. 15, 2011 (FR) .................................. 11 51223

(51) Int. Cl.
*G06F 9/48* (2006.01)
*G06F 17/50* (2006.01)

(52) U.S. Cl.
CPC .............. *G06F 9/48* (2013.01); *G06F 9/4881* (2013.01); *G06F 9/4887* (2013.01);
(Continued)

(58) Field of Classification Search
None
See application file for complete search history.

(56) References Cited

U.S. PATENT DOCUMENTS 8,296,741 B1 * 10/2012 Huang ................ G06F 11/3604
717/135
8,458,630 B1 * 6/2013 Van Canpenhout .. G06F 17/505
716/104
(Continued)

FOREIGN PATENT DOCUMENTS

CN      101196826 A      6/2008
CN      101315648 A     12/2008
(Continued)

OTHER PUBLICATIONS

Sirowy et al., Online SystemC Emulation Acceleration, Jun. 18, 2010, ACM.*

(Continued)

*Primary Examiner* — Abu Ghaffari
(74) *Attorney, Agent, or Firm* — Baker Hostetler LLP

(57) ABSTRACT

A device is provided for accelerating, on a platform comprising a plurality of processing units, the execution of a SystemC simulation of a system, said simulation comprising a SystemC kernel and SystemC processes. The device comprises hardware means for scheduling the SystemC processes on the processing units in a dynamic manner during the execution of the simulation, these means making it possible notably to preempt the processing units.

6 Claims, 6 Drawing Sheets

(52) U.S. Cl.
CPC ...... *G06F 17/5009* (2013.01); *G06F 17/5027* (2013.01); *G06F 17/5022* (2013.01); *G06F 2217/86* (2013.01)

(56) References Cited

U.S. PATENT DOCUMENTS

| | | | | |
|---|---|---|---|---|
| 8,751,211 | B2* | 6/2014 | Tal | G06F 17/5022 703/13 |
| 2003/0037270 | A1* | 2/2003 | Venkitakrishnan | G06F 1/32 713/320 |
| 2005/0229170 | A1* | 10/2005 | Bellantoni | G06F 17/5022 717/165 |
| 2006/0149526 | A1* | 7/2006 | Torossian | G06F 17/5022 703/16 |
| 2009/0222250 | A1* | 9/2009 | Ito | G06F 17/5022 703/14 |
| 2010/0058269 | A1* | 3/2010 | Baker | G06F 17/505 716/122 |
| 2011/0307847 | A1* | 12/2011 | Liao | G06F 17/5027 716/103 |
| 2012/0017197 | A1* | 1/2012 | Mehta | G06F 17/5022 717/104 |
| 2012/0029899 | A1* | 2/2012 | Dorfel | G06F 11/3457 703/21 |
| 2012/0197625 | A1* | 8/2012 | Wang | G06F 9/485 703/22 |

FOREIGN PATENT DOCUMENTS

| | | |
|---|---|---|
| CN | 101329702 A | 12/2008 |
| CN | 101634979 A | 1/2010 |
| CN | 101635006 A | 1/2010 |
| CN | 101770362 A | 7/2010 |
| JP | 2008059192 A * | 3/2008 |
| JP | 2010009113 A * | 1/2010 |
| JP | 2010181961 A * | 8/2010 |

OTHER PUBLICATIONS

Sirowy et al, Online SystemC Emulation Acceleration, 2010, ACM, DAC'10, Proceedings of the 47th Design Automation Conference, pp. 30-35.*

Ezudheen et al, Parallelizing SystemC Kernel for Fast Hardware Simulation on SMP Machines, 2009, IEEE, Proceeding PADS '09 Proceedings of the 2009 ACM/IEEE/SCS 23rd Workshop on Principles of Advanced and Distributed Simulation, pp. 80-87.*

Schumacher et al, parSC: Synchronous Parallel SystemC Simulation on Multi-Core Host Architectures, 2010, CODES+ISSS' 10, pp. 241-246.*

N. Ventroux et al., "SESAM: An MPSoC Simulation Environment for Dynamic Application Process", 2010 IEEE 10th Internaitonal IConference on Computer and Information Technology (CIT), Jun. 29, 2010, pp. 1880-1886, IEEE, Piscataway, NJ, USA, XP031757603.

Nicolas Ventroux et al., "SCMP Architecture: An Asymmetric Multiprocessor System-On-chip for Dynamic Applications", 2010 Proceedings of the Second International Forum on Next-Generation Multicore/Manycore Technologies (IFMT), Jun. 19, 2010, pp. 1-12 XP055012079.

C. Bechara, et al., "A TLM-Based Multithreaded Instruction Set Simulator for MPSoC Simulation Environment" Methods and Tools International Workshop on Rapid Simulation and Performance Evaluation, URL nventrou.free.fr/papers/RAPID02011_CB.pdf, Jan. 2011, pp. 1-7, XP002663624.

A. Guerre, "Approche hierarchique pour la gestion dynamique des taches et des communications dans les architectures massivement paralleles programmables", nventrou.free.fr/thesis/these_aguerre. pdf, Sep. 24, 2010, pp. 125-132, Universite Paris-Sud 11, FR XP002663625.

* cited by examiner

US 9,612,863 B2

HARDWARE DEVICE FOR ACCELERATING THE EXECUTION OF A SYSTEMC SIMULATION IN A DYNAMIC MANNER DURING THE SIMULATION

CROSS-REFERENCE TO RELATED APPLICATIONS

This application is a National Stage of International patent application PCT/EP2012/052386, filed on Feb. 13, 2012, which claims priority to foreign French patent application No. FR 1151223, filed on Feb. 15, 2011, the disclosures of which are incorporated by reference in their entirety.

TECHNICAL FIELD

The present invention relates to a device for accelerating the execution of a SystemC simulation. It applies for example in the field of tools for verifying and emulating complex circuits.

PRIOR ART AND TECHNICAL PROBLEM

With applications becoming ever more complex and powerful, the systems to be designed to support these applications require the use of ever more significant and faster simulation means. The simulation of these systems has several roles. It makes it possible not only to provide a support for the development of the applicational layers and the validation of the applications, but also to design, dimension, evaluate the performance and to explore the design space in order to guarantee operation and to validate the chosen solutions. Moreover, the dynamism of the applications makes it impossible to focus solely on peak performance and simulations alone make it possible to estimate and to understand actual performance and to correctly dimension the architecture of these systems. Thus, the simulation of very large systems, such as multiprocessor architectures consisting of several tens, or indeed several hundreds, of computation cores, may turn out to be very slow, from several days to several weeks. In the design cycle of such a system, the architect must produce a functional or indeed transactional model with temporal information in order to perform the dimensioning, the evaluation of the actual performance of his system, and the exploration of various architectural solutions so as to find the one that best meets his needs. But when the system becomes too complex, it is no longer possible to retain this model and the designer must then make methodological choices.

For numerous years, the C or C++ language has been used to develop software and hardware systems. The use of this language is due to several reasons. Firstly, it is easy to use and well known by systems designers. Next, numerous algorithms and applications are described and available in this language and this makes it possible to reuse existing libraries or code to reduce development costs. Finally, it makes it possible to describe in one and the same program the software and hardware parts of a system and their interactions. However, the C or C++ language does not make it possible to describe concurrence or the notion of time, indispensable for the design of hardware systems. Accordingly, the hardware model must be translated manually into a hardware description language such as VHDL (Very high speed integrated circuits Hardware Description Language) or VERILOG. The benefit of a translation of a hardware model into VHDL or VERILOG stems from the fact that it is executable and can thus be verified by simulation, or by means of hardware emulation. But a major drawback is that this translation is lengthy and very difficult. Moreover, it often introduces errors or imposes hitherto ignored constraints which change the assumptions or the initial specifications.

To attempt to address these drawbacks, a consortium, named the Open SystemC Initiative (OSCI), has developed a new international standard (IEEE Std. 1666™-2005) called SystemC which today is very widely used throughout the world. SystemC is a C++ library associated with a simulation engine, capable of plugging these gaps and of transforming the C and C++ language into a hardware description language. SystemC therefore introduces notably the notions of concurrence and of time. Today, tools allow the hardware synthesis of systems described in SystemC at the RTL (Register Transfer Level) level via an automatic translation into VHDL or VERILOG. Thus, the means of hardware emulation available for these hardware description languages can be used to accelerate simulations. However, describing a system in RTL is lengthy and irksome, and it is very expensive to revise one's architectural choices. Indeed, the RTL description level is such that it is very lengthy to obtain a functional solution. Moreover, it is necessary to develop the system code and to port an application in order to validate the architecture. It is therefore necessary to make choices very early, that is to say in the design phase, relating to the programming and execution model, these choices possibly turning out to be unsuitable. Finally, software developers cannot have access to this type of emulation platform, since it requires the use of hardware design tools that are unknown to software engineers which are not integrated into their development environment. Thus, this solution is conceivable only for validating the system before commencing the manufacturing process, when all the tools, the software and the complete system have been defined, produced and validated.

To attempt to address this drawback, a new C++ library called Transactional Level Modeling (TLM) has been created, providing a much greater level of abstraction than that of the RTL level able to also integrate high-level temporal information. In particular, TLM makes it possible to abstract the communications between the SystemC processes and to increase simulation speeds. This TLM library in fact addresses a growing need for the design of ever more complex systems. Thus, software developers have the possibility of using a fast functional model of the architecture. But here again the drawbacks are numerous. Firstly, only part of the validations can be carried out since the model no longer has accurate temporal information. Moreover, the optimization of the code is no longer possible and it is not for example possible to accurately estimate the cost of the communications between the various tasks or memories. Finally, this model does not allow the exploration of the whole of the design space, since it does not afford sufficient information.

Thus, it seems that no solution exists today which is capable of addressing at one and the same time the problems of software design and the design of complex systems.

In Chinese patent applications CN101634979, CN101315648, CN101329702, CN101635006, CN101770362 and CN101196826 filed by the Institute of Computer Technologies of the Academy of Sciences of China, the use of specific hardware units to accelerate the execution of SystemC simulations is proposed. Partnered with a RISC (Reduced Instruction Set Computer) processor, hardware units capable of emulating SystemC primitives or functions are used to accelerate the simulations. These primitives support, for example, dynamic management of processes (SC_SPAWN), semaphores and mutual exclusions (mutex), FIFOs (First In First Out) and the management of sensitivity lists and events.

In addition, particular units for exchanging data between processes are used to store the values of the signals. A major drawback of this approach is that it requires a profound modification of the SystemC library in order to use the primitives on the hardware units. Moreover, the limited number of hardware units irretrievably constrains the modeling possibilities. Finally, the execution of the SystemC processes is considerably slowed through incessant changes of context. Generally, the process management usually carried out by simulations relying on the SystemC language is very constraining and very greedy in terms of computation time.

DISCLOSURE OF THE INVENTION

The aim of the invention is notably to accelerate any type of SystemC simulation described in a C or C++ language, using the SystemC and TLM standard libraries without any modification. Accordingly, the invention proposes a hardware acceleration of the SystemC kernel capable of distributing the set of processes dynamically over a plurality of computation units. For this purpose, the subject of the invention is a device for accelerating, on a platform comprising a plurality of processing units, the execution of a SystemC simulation of a system, said simulation comprising a SystemC kernel and SystemC processes. The device comprises a hardware unit for executing the SystemC kernel scheduling the SystemC processes on the processing units in a dynamic manner during the execution of the simulation.

Advantageously, the hardware unit for executing the SystemC kernel scheduling the SystemC processes makes it possible to preempt the processing units, so that if a first SystemC process executed by a processing unit is idle on standby awaiting synchronization with a second SystemC process, then said processing unit is preempted, said processing unit saving its execution context in a memory shared by the processing units and beginning the execution of another SystemC process, the execution of the first process being resumed subsequently.

Advantageously, the simulated system can be described at the RTL level or at the TLM level.

In a preferential embodiment, the hardware unit for scheduling the SystemC processes can include means for executing the SystemC kernel. It can also include means for managing events, these means being able to include a list of all the generatable events associated with identifiers of the SystemC processes sensitive to said events. It can also include means for managing the time, these means being able to include a watchdog for each of the SystemC processes.

For example, the means for executing the SystemC kernel can include a RISC processor for executing the instructions forming the SystemC kernel.

The means for executing the SystemC kernel can also include a graph of dependency between the SystemC processes, in such a way as to activate child processes, provided that their respective parent processes have been executed.

In a preferential embodiment, the means for managing the time can include a counter providing a current simulated time. They can also include a memory containing a list of the simulated times to be reached by each of the processes currently executing on the processing units. They can also include a memory containing a list of the states of each of the processes currently executing on the processing units, this state indicating that the process is active or on standby. They can also include means for comparing the current simulated time with the simulated times to be reached by each of the processes. The state of a process can then switch from the active state to the standby state, provided that the current simulated time has reached the simulated time to be reached associated with said process.

The means for managing events can include a memory containing a list of event identifiers. They can also include a memory containing, for each event identifier, the address in another memory of a list of the processes sensitive to said event.

Advantages

The main advantages of the invention are furthermore that it supports transactional communications and allows the acceleration of SystemC simulations at a high level of abstraction. It also proposes debugging and trace means for validating the model or the application executed.

The main advantages of the invention are furthermore that it offers a fast and very flexible temporal model, that can be integrated into any development or design environment. It offers software and hardware developers an ideal solution for the design of complex systems. This has a very significant impact on development times and constitutes a major advantage in respect of competitively.

DESCRIPTION OF THE FIGURES

Other characteristics and advantages of the invention will become apparent with the aid of the following description given in relation to appended drawings which represent.

DESCRIPTION OF THE INVENTION ON THE BASIS OF THE FIGURES

The invention includes notably a hardware environment capable of accelerating the SystemC simulations at variable levels of abstraction, whether involving RTL, TLM or even TLM with incorporation of temporal information, of digital and analog complex systems, as well as of their software and hardware parts. This hardware environment consists of a plurality of computation processors capable of executing SystemC processes, of at least one hardware acceleration unit for the SystemC kernel in charge of dynamically scheduling the execution of the SystemC processes, of memories, of inputs-outputs to emulate the inputs-outputs of the simulated system, as well as of means of debugging and tracing. These units for hardware acceleration have access to a unit for managing the events linking the sensitive processes so as to select the processes to be executed, as well as to a temporal management unit so as to manage the set of temporal synchronizations present in SystemC which govern the competition between the processes, and as well as to a graph of dependency between processes so as to determine a partial order of scheduling and to minimize the number of changes of context.

Figure 1:
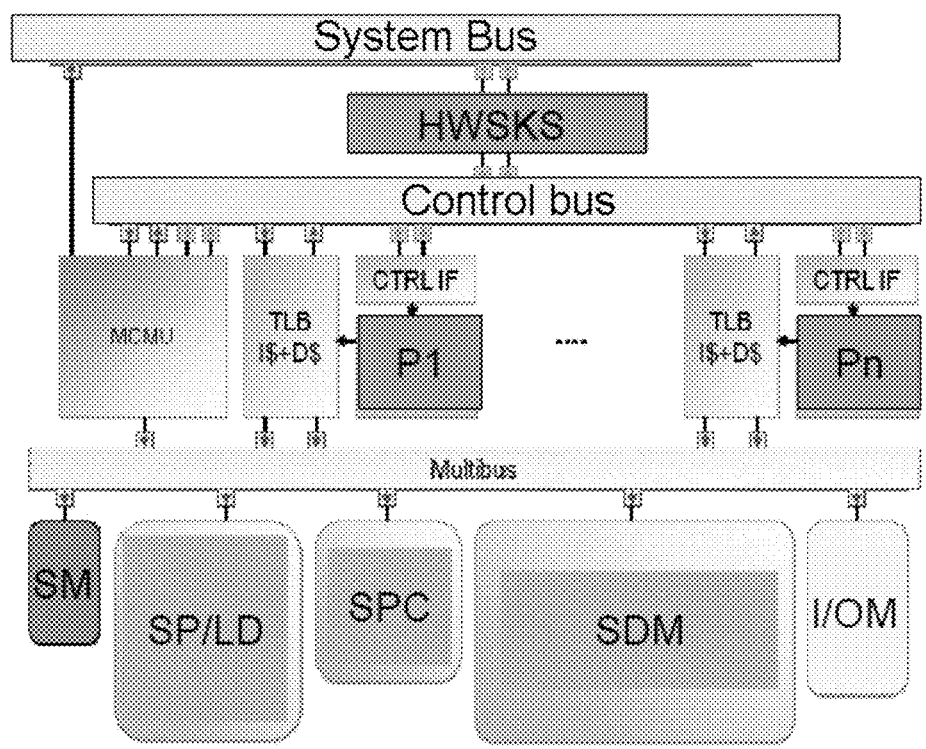
FIG. 1, by a diagram, an illustration of an exemplary embodiment of the invention on a multiprocessor platform.

FIG. 1 illustrates by a diagram an exemplary implementation of the invention in a multiprocessor environment. The hardware environment includes a plurality of computation units P1 to Pn controlled by a hardware unit HWSKS according to the invention (Hardware SystemC Kernel Sequencing), this unit HWSKS making it possible to control the processes manipulated by the SystemC kernel. This, so-called asymmetric, architecture exhibits the advantage of explicitly separating control, that is to say the execution of the SystemC kernel by the unit HWSKS, and computation, that is to say the evaluation of the SystemC processes by the processors P1 to Pn.

In this embodiment, the computation units P1 to Pn are processors capable of executing the SystemC processes. Each computation unit P1 to Pn is accompanied by a control interface CTRL_IF for communicating with the unit HWSKS via a control bus and by a unit TLB for translating the cache memories so as to access the content of the shared memories. The computation units P1 to Pn are linked via an interconnection network, a multibus for example, to various memories as well as to a unit I/OM for managing the inputs-outputs (I/O Management). A memory SPC (SystemC Processes Context) makes it possible to save the contexts of the various active SystemC processes. It is shared by the processors P1 to Pn. A memory SP/LD (SystemC Processes/Local Data) makes it possible to store the code related to the SystemC processes, such as instructions, local variables and constants. A memory SDM (Shared Data Memory) makes it possible to store the data shared between the SystemC processes such as global variables and constants. Finally, a system memory SM (System Memory) contains the set of routines of the system software for supporting the preemptions or the initialization of the computation units P1 to Pn for example.

In this embodiment, an MCMU (Memory Configuration and Management Unit) makes it possible to transfer on initialization the code of the SystemC processes, and to dynamically manage accesses to the shared memories. This unit makes it possible to manage pagination and translations associated with the codes of the SystemC processes and of their context, as well as the dynamic allocation of memory space in the shared memory.

In accordance with the invention, the control unit HWSKS allows the hardware execution of the SystemC kernel.

Hereinafter in the present patent application, the term "process" is used to designate implicitly SystemC processes.

Figure 2:
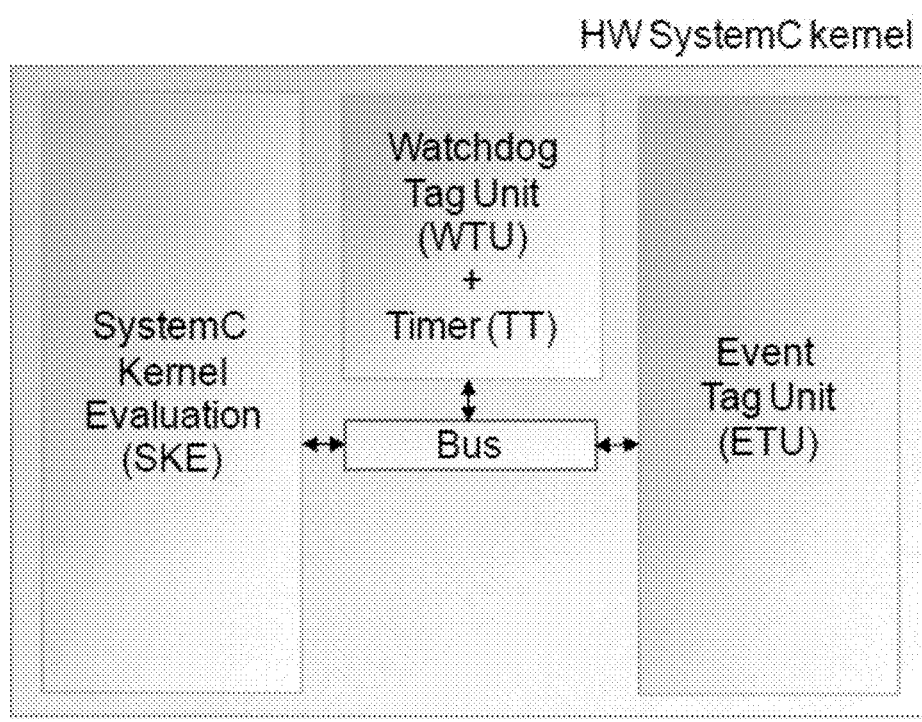
FIG. 2, by a diagram, an illustration of an exemplary embodiment of a control unit according to the invention.

FIG. 2 illustrates by a diagram an exemplary embodiment of the unit HWSKS according to the invention, which supports the execution of the SystemC kernel. It takes account of a graph of dependency between the processes for determining their order of activation, this graph not being represented in FIG. 2. The unit HWSKS comprises a unit ETU for managing the events (Event Tag Unit) which possesses the list of all the generatable events associated with the index numbers of the processes to be activated on occurrence of these events. The unit ETU can be a functional equivalent to a memory search and pagination block, used within the framework of events management. The unit HWSKS also comprises a unit WTU for managing the time (Watchdog Tag Unit) which possesses a watchdog for each of the processes and makes it possible to reference the processes on standby awaiting synchronization and to evaluate the lengthy waits for synchronization. The unit WTU thus avoids the needless waking up of processes. Advantageously, the unit WTU makes it possible to execute more processings in parallel. The unit HWSKS then uses this information to activate the processes and to distribute their execution over the computation units P1 to Pn, via the control bus of FIG. 1 for example. Thus the time management is carried out in an explicit manner: the waiting times can be defined, pauses can be programmed into the execution of the processes.

The scheduling of the processes is done in a dynamic manner, that is to say during the execution of the simulation. A process allocated on one computation unit from among P1 to Pn can be preempted or migrated to another computation unit from among P1 to Pn if the unit HWSKS so decides. A SystemC clock manager TM (Timer Management) allows each process to have access to the current simulation time and allows the SystemC kernel to schedule its processes as a function of time.

In the embodiment of FIGS. 1 and 2, the control unit HWSKS can be a programmable structure comprising, in addition to the hardware units ETU and WTU, a module SKE (SystemC Kernel Evaluation) including for example a RISC (Reduced Instruction Set Computer) processor, so that the module SKE can execute the code of the SystemC kernel. Thus, the execution of this code, via the use of the hardware units ETU and WTU, has a behavior compatible with the SystemC kernel arising from the standard version. The module SKE also uses a graph of dependency between the processes, which is a data structure organized in the form of a chained list. In this list, each process possesses parent processes and child processes. When the parent processes have been evaluated, the child processes are activated. Advantageously, the module SKE can circumvent a task for monitoring the dates of triggering of the events: indeed, the unit WTU carries out autonomous time management.

Figure 3:
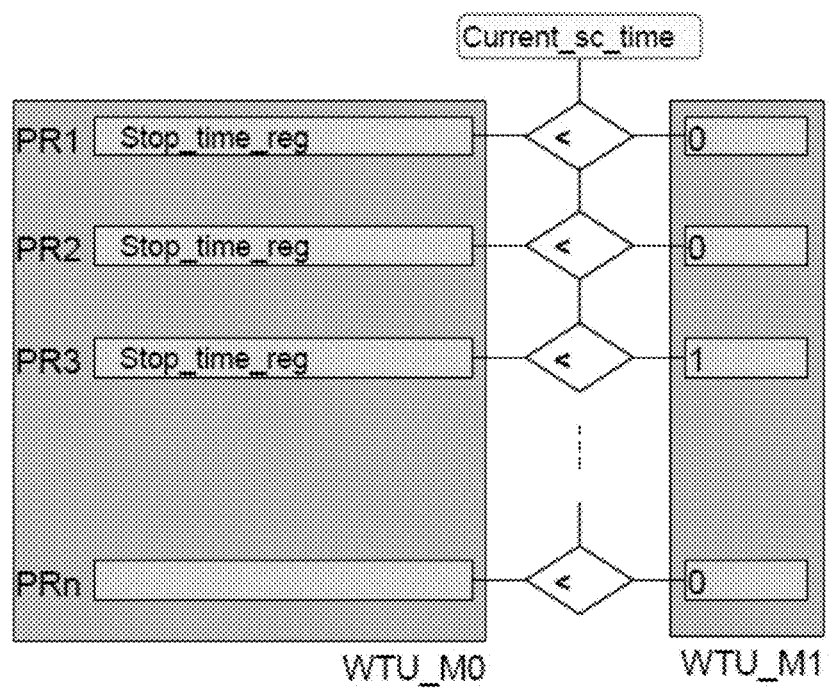
FIG. 3, by a diagram, an illustration of an exemplary embodiment of a unit for managing the time according to the invention.

FIG. 3 illustrates an embodiment of the unit WTU comprising two memories WTU_M0 and WTU_M1, as well as a set of comparators represented by symbols "<" and a clock TT. The clock TT can be a hardware counter Current_sc_time which represents the SystemC current time, which will be called the "simulated time" subsequently. This counter is incremented at each simulation increment, once all the processes have been evaluated and the unit ETU is empty. The memory WTU_M0 contains, for each of the processes PR1 to PRn, the simulated time to be reached Stop_time_reg. When this time is reached, that is to say when Current_sc_time=Stop_time_reg, the content of the memory WTU_M1 is updated. The processor SKE can access this memory WTU_M1 to verify the state of the processes. If the content of the memory is positive (1), the process is considered to be on standby. In the converse case (0), the process is considered to be active.

Figure 4:
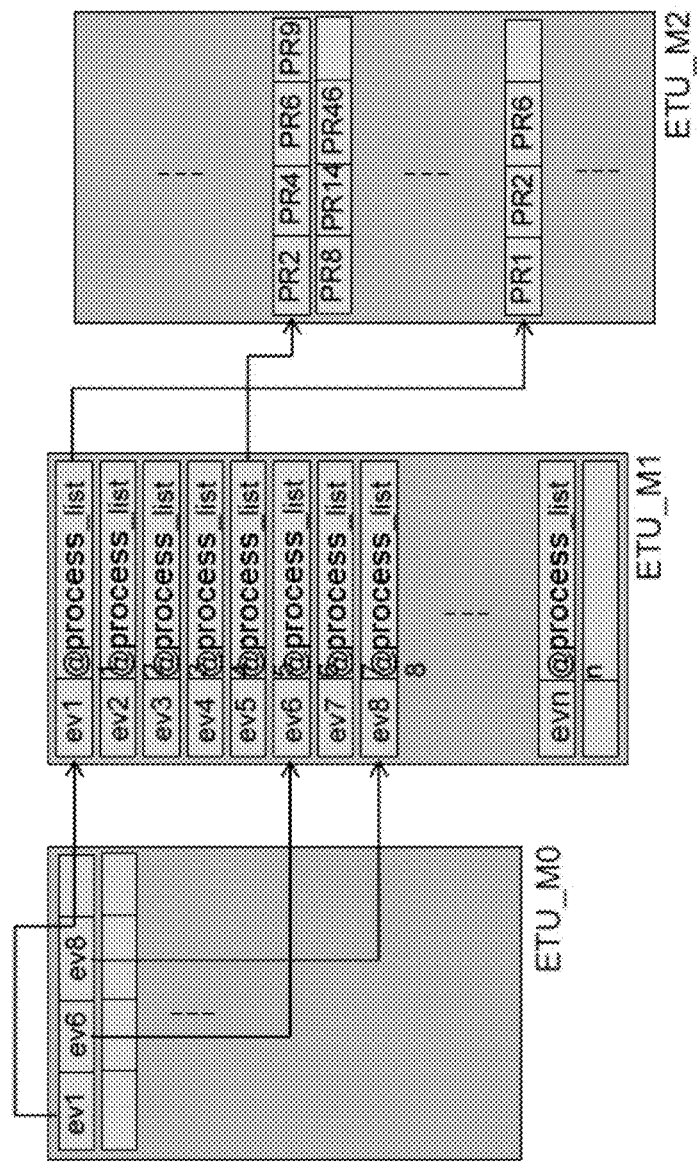
FIG. 4, by a diagram, an illustration of an exemplary embodiment of a unit for managing the events according to the invention.

FIG. 4 illustrates an embodiment of the unit ETU comprising three memories ETU_M0, ETU_M1 and ETU_M2. The memory ETU_M0 makes it possible to store the event identifiers of the type evn, which are generated during the evaluation of the processes. The memory ETU_M1 is a memory, each line of which contains a word comprising two fields. The first field is an event identifier, of the type evn in FIG. 4, and the second one is an address in a memory ETU_M2, of the type @process_listm in FIG. 4, of a list of processes PR1 to PRn sensitive to this event evn. The memory ETU_M2 therefore contains lists of processes and the addresses of the type @process_listm specified in the memory ETU_M1 are pointers to slots of the memory ETU_M2. These three memories ETU_M0, ETU_M1 and ETU_M2 therefore make it possible, on the basis of an event, to rapidly retrieve all the sensitive processes, so as to be able to activate them subsequently. Thus, for each of the events, all the sensitive processes regarding this event are activated. When all the processes of an event evn in ETU_M0 have been activated, the corresponding event is deleted from the memory ETU_M0. Once all the events have been deleted from ETU_M0, the unit ETU is considered to be empty.

In the embodiment illustrated by the preceding figures, the user loads into the unit HWSKS the graph of dependencies between the processes, as well as the set of codes related to the processes in the memory SP/LD. The unit HWSKS then commences its execution cycle according to the operation of the SystemC kernel and executes all the processes in parallel according to the availability of the computation units P1 to Pn. All the processes are then initialized and then executed until they encounter a synchronization. Some of them will then update their output signals or dispatch transactions to other processes. In the latter case, according to the TLM standard, the so-called "transport" functions of the target processes concerned are executed until their evaluation is complete. Thus, all the processes will execute until they encounter a synchronization, until all the processes in WTU_M1 are positive and until the list of events activated in the unit ETU_M0 empty. The role of the unit HWSKS will be just to equitably distribute the various processes between the computation units P1 to Pn. When all the executed processes are idle on standby awaiting synchronization in the unit WTU, the clock manager TM increments the SystemC clock according to the simulation increment. Next, according to the graph of dependency between the active processes, the unit HWSKS again evaluates the processes which are no longer on standby in the unit WTU while optimizing the distribution of the load of the computation units P1 to Pn. This method takes place until the end of the simulation.

Figure 5:
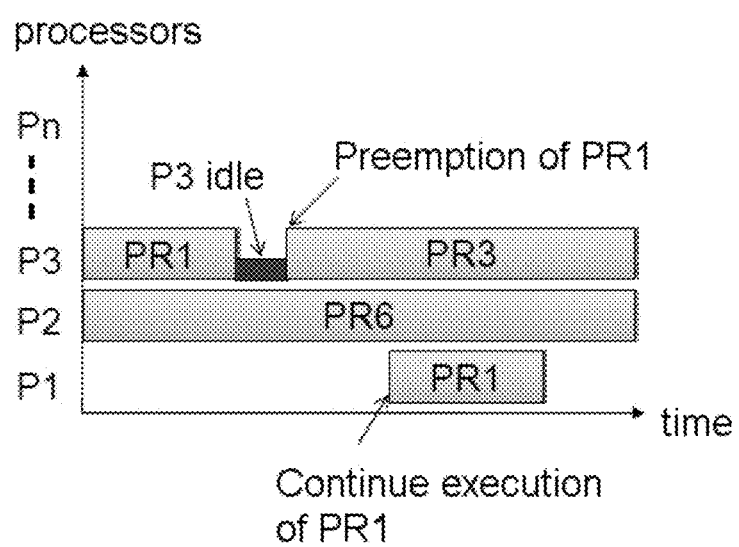
FIG. 5, by a diagram, an example of scheduling of SystemC processes on a plurality of computation resources.

As illustrated by FIG. 5, a major advantage of this invention resides in its ability to dynamically schedule processes on the various homogeneous computation units P1 to Pn. This ability is made possible by virtue of the complementarity of the elements constituting the invention. To allow the preemption and the migration of the processes between the computation units P1 to Pn, it is necessary firstly to have a scheduling algorithm capable of taking such decisions which is executed by the control unit HWSKS by way of its RISC processor. This algorithm can therefore simply, as a function of the duration of execution of the processes or of their activity, decide to preempt them, so as to execute them subsequently on an identical or different processor. As presented in FIG. 5, let us assume for example that the process PR1 is evaluated on the processor P3. If PR1 places itself on standby awaiting a synchronization with another process PR6 (currently undergoing evaluation or not), the process PR1 is idle and the processor P3 is then under-used. The invention proposes to interrupt PR1 until it is no longer idle, so as to execute another process, for example PR3, which for its part will not be idle. When the processor executing the process involved in the preemption request, dispatched by HWSKS, receives the command, the processor saves its context in the shared memory SPC. This memory is accessible and shared between all the processors via the interconnection network, the multibus in the present exemplary embodiment. When the control unit HWSKS desires to resume the execution of the process PR1, it can arbitrarily assign it a free processor so that the latter can continue its evaluation, the processor possibly being the previously preempted processor or any other processor from among P1 to Pn.

Figure 6:
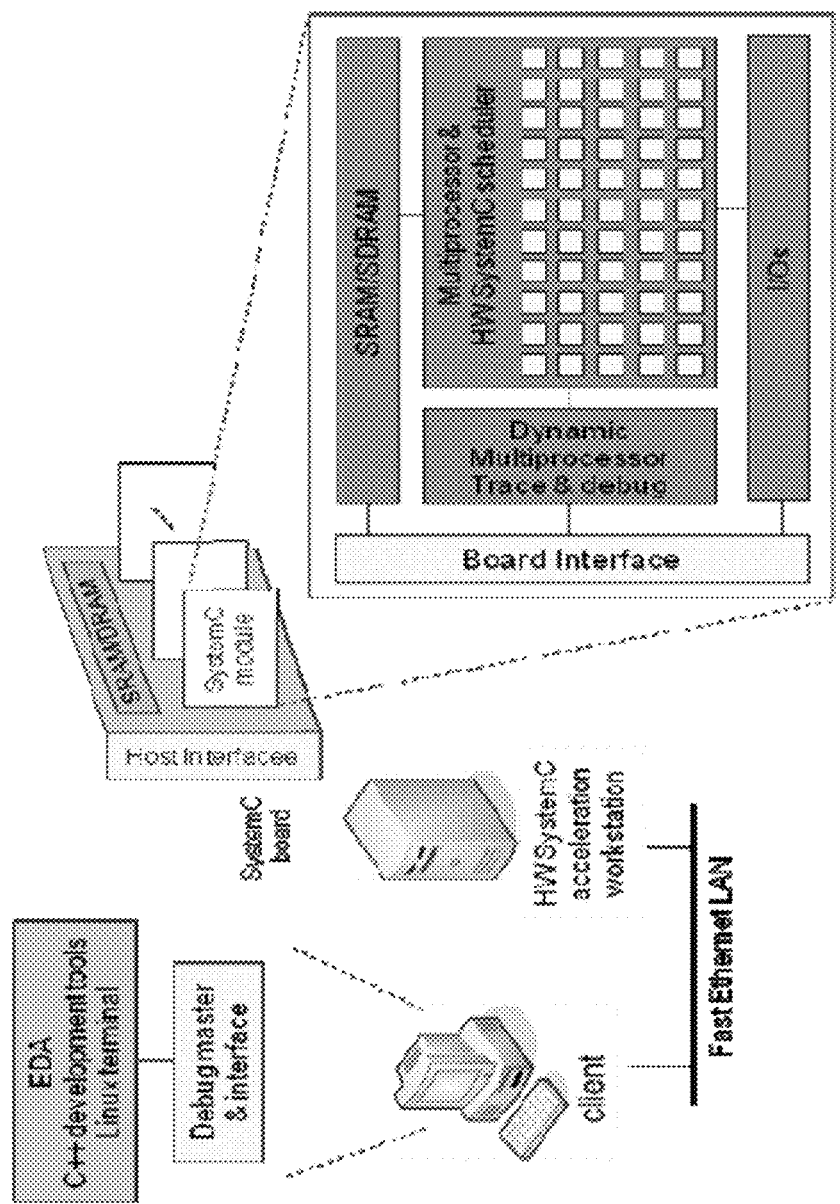
FIG. 6, by a diagram, an illustration of an exemplary embodiment of the invention on a computation server accessible via an Ethernet network.

FIG. 6 illustrates by a schematic another embodiment, integrating on an emulation card installed in a computation server accessible to a set of clients via an Ethernet network several SystemC acceleration hardware environments according to the invention. The user can execute the simulator via his work environment and his development tools. By virtue of a particular client-server interface, the simulator can be executed on a remote emulation card and all the debugging and trace information related to the user interface can be redirected to the client. Thus, the user has the impression of executing the simulator locally whereas it is executing on a remote system. The remote system can be a computation server possessing one or more accelerator cards, each being able to receive one or more SystemC acceleration modules. Each SystemC acceleration module can consist of an architecture similar to that presented above, with in addition a debugging and trace unit capable of transferring all the information required for the development tools used by the user.

Other Advantages

The invention described above provides a means for accelerating simulations as well as a support making it possible to considerably reduce design times. Indeed, the ability to rapidly roll out a new system onto the embedded-electronics market is directly related to the competitively and to the penetration and success factor of the commercial product.

In the invention, the problem of managing the computation time is solved in a hardware manner by a set of hardware means making it possible to improve the speed of execution of a SystemC simulation. Notably, distributing the SystemC processes over several processors makes it possible to parallelize the execution thereof, thus appreciably accelerating the SystemC simulation.

Advantageously, the hardware devices put in place according to the invention make it possible to gain computation time in the execution of the SystemC kernel so as to allocate it to the applications themselves.

The invention claimed is:

1. A hardware device for accelerating an execution of a SystemC simulation of a system on a platform, said SystemC simulation comprising a SystemC kernel and SystemC processes, said platform comprising a plurality of processing units for executing SystemC processes, the device comprising a hardware control unit for executing the SystemC kernel, the SystemC kernel being configured to schedule the SystemC processes in parallel on the plurality of processing units in a dynamic manner during the execution of the simulation, wherein the SystemC kernel is configured to schedule the SystemC processes on the processing units in parallel, and the hardware control unit for executing the SystemC kernel is configured to preempt the SystemC processes, a processing unit being preempted if a first SystemC process executed by said processing unit is an idle process on standby awaiting a synchronization with a second SystemC process, said processing unit saving its execution context in a memory shared by the plurality of processing units and beginning an execution of another SystemC process, the execution of said first SystemC process being resumed subsequently on a processing unit, wherein the hardware control unit for executing the SystemC kernel scheduling the SystemC processes includes:

a SystemC kernel evaluation module for executing a code of the SystemC kernel;

an event tag unit for managing events, the event tag unit including a list of all generatable events associated with identifiers of the SystemC processes sensitive to said generatable events, and a watchdog time unit for managing synchronization times of the SystemC processes the watchdog time unit including a watchdog for each of the SystemC processes.

2. The hardware device as claimed in claim 1, wherein the simulated system is described at a Register Transfer Level (RTL) level or at a Transactional Level Modeling (TLM) level.

3. The hardware device as claimed in claim 1, wherein the SystemC kernel evaluation module includes a Reduced Instruction Set Computing (RISC) processor for executing instructions forming the SystemC kernel.

4. The hardware device as claimed in claim 1, wherein the SystemC kernel evaluation module includes a graph of a dependency between the SystemC processes to activate child processes, provided that respective parent processes of said child processes have been executed.

5. The hardware device as claimed in claim 1, wherein the watchdog time unit includes:

a counter providing a current simulated time;

a first memory containing a list of the simulated times to be reached by each of the SystemC processes currently executing on the plurality of processing units;

a second memory containing a list of states of each of the SystemC processes currently executing on the plurality of processing units, a state in the list indicating that the SystemC process is in an active state or in a standby state;

at least one comparator for comparing a current simulated time with simulated times to be reached by each of the SystemC processes;

the state of the SystemC process switching from the active state to the standby state provided that the current simulated time has reached the simulated time to be reached associated with said SystemC process.

6. The hardware device as claimed in claim 1, wherein the event tag unit includes:

a first memory containing a list of event identifiers;

a second memory containing, for each event identifier, an address of a list of processes sensitive to an event respectively associated with each said event identifier, said address being a pointer to a third memory comprising said list of processes.

* * * * *